March 14, 1944. F. W. FRINK 2,344,296
MEANS AND METHOD FOR CATHODE RAY OSCILLOSCOPE
OBSERVATION AND RECORDATION
Original Filed Jan. 25, 1938 2 Sheets-Sheet 1
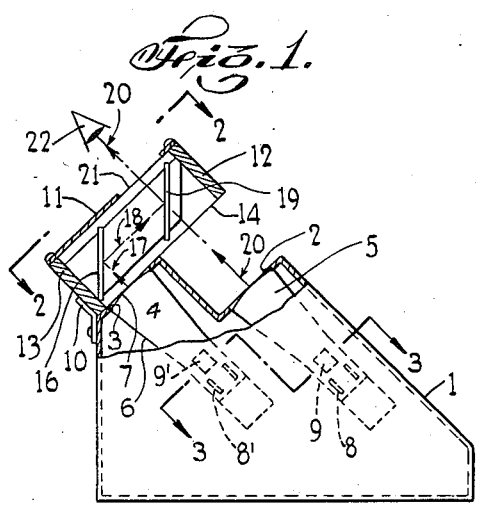
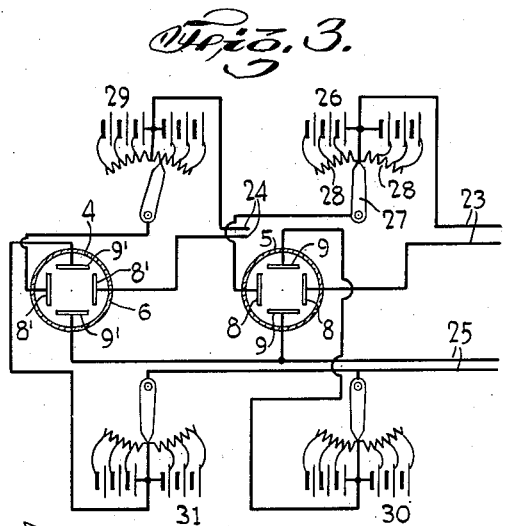

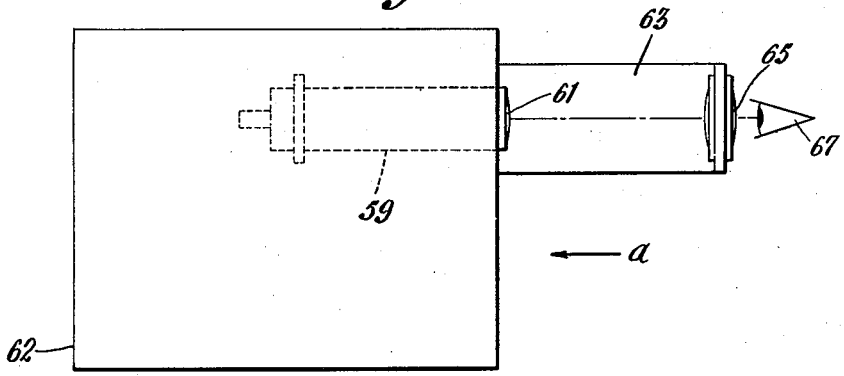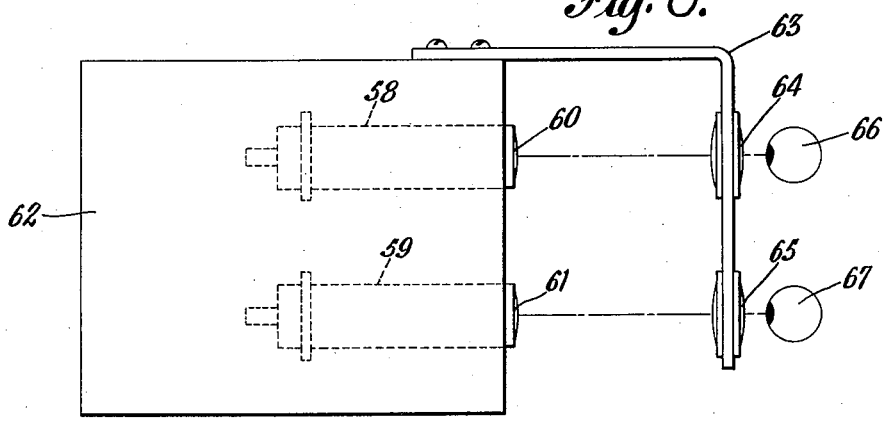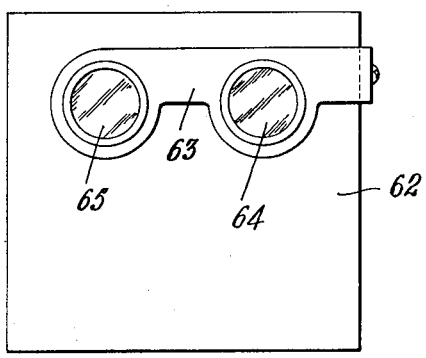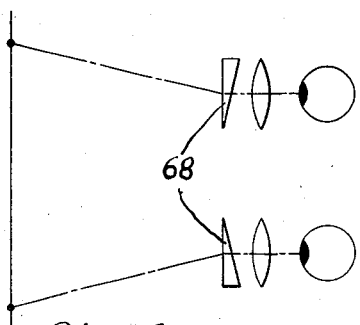

Patented Mar. 14, 1944

2,344,296

UNITED STATES PATENT OFFICE 2,344,296

MEANS AND METHOD FOR CATHODE RAY OSCILLOSCOPE OBSERVATION AND RECORDATION

Frederick W. Frink, New York, N. Y.

Original application January 25, 1938, Serial No. 186,794. Divided and this application November 29, 1940, Serial No. 367,707

9 Claims. (Cl. 171—95)

This invention relates to improvements in comparing the outlines of forms traced on the screens of cathode ray oscilloscopes.

The main object of the invention is to provide improved means which shall increase the efficiency and accuracy of results produced by devices of the character described.

A further object of the invention is to provide for simultaneously viewing or photographing, and accurately comparing, the cathode ray images produced by two or more voltages. By the comparison as provided for by this invention the differences in two outlines, as for instance the wave forms of two periodic voltages, may be compared and this may be availed of to compare any given outline, as for instance a voltage wave form, with a standard outline, for instance a standard voltage wave form, whereby the coincidence with or divergence from the standard wave form may be noted. To make possible the comparison of, for instance, the wave forms of two periodic voltages, devices known as electronic switching circuits have been used. These circuits function in such a manner that the vertical deflection plates of the cathode ray tube are connected to the two sources of voltage alternately, the commutation occurring at a frequency high enough so that the curves produced by the two voltages appear to be present on the screen continuously and simultaneously. Such circuits are useful in various applications, such for example, as comparing the audio frequency output voltage of a modulator tube with the modulation envelope of the high frequency wave which it modulates. Such circuits are, however, complicated and expensive and are open to the objection that the voltages to be studied must be passed through amplifier tubes, which are used as switches for connecting and disconnecting the two sources of voltages. These amplifier tubes may change the appearance of the resulting curves, by introducing frequency, phase, or amplitude distortion, particularly when high frequency complex waves are being studied. Furthermore, because of the gradual deterioration of the amplifier tubes, defective results may be obtained, before it is realized that the tube characteristics have become inadequate. Another disadvantage of the electronic switching circuits is the fact that they are not suited for the viewing or photographing of curves produced by simultaneous transient voltages. Furthermore such circuits are of such a nature that interference might be generated by them when the characteristics of radio equipment are being studied. Because of the development of low priced cathode ray oscilloscope tubes, an oscilloscope can now be equipped with two tubes at moderate cost. Such an oscilloscope may have a common horizontal sweep circuit and when so equipped can be used for simultaneously viewing the images of two voltages especially those whose frequencies are equal or harmonically related. Such oscilloscope is not open to the above mentioned objections applying to electronic switching circuits. However, in order to compare the two cathode ray outlines most accurately it is desirable to be able to superpose the two outlines, one on the other, and this can be done according to the present invention by giving the outlines of the separate cathode ray tubes the appearance of being superposed, one on the other.

A further object of the invention is to provide an improved method which shall increase the accuracy of, and the efficiency of producing, results as indicated.

A further object of the invention is to provide for easily tracing and recording cathode ray outlines.

A still further object of the invention is to facilitate the measurement of the cathode ray outlines.

Other and ancillary objects of the invention within the scope of the appended claims will appear hereinafter.

This application is a division of my prior application Serial Number 186,794, filed January 25, 1938.

In the accompanying drawings which illustrate the invention—

Fig. 1 is a side elevation, partly in section, of apparatus embodying the invention;

Fig. 2 is a side elevation of the apparatus of Fig. 1 viewed on the line 2—2 of Fig. 1;

Fig. 3 is a section, on an enlarged scale, on the line 3—3 of Fig. 1 showing the cathode ray deflection plates and also the connection of the circuits thereto;

Fig. 4 is a modification of apparatus for simultaneously viewing and comparing images on screens of three or more cathode ray tubes;

Fig. 5 is an end elevation of apparatus embodying the invention wherein a rotating mirror is employed in connection with the comparing of the two oscilloscope images;

Fig. 6 is a face view of the rotating mirror of Fig. 5;

Fig. 7 is a side elevation of apparatus embodying the invention wherein a stereoscopic device is used for comparing the images;

Fig. 8 is a top plan view of the apparatus of Fig. 7;

Fig. 9 is a side elevation of the apparatus of Figs. 7 and 8 viewed as indicated by the arrow a of Fig. 7; and Fig. 10 is a diagrammatic view showing the course of the light rays with a different optical arrangement from that shown in Figs. 7, 8 and 9.

Referring to the drawings, and first to Figs. 1 to 3 inclusive, the device comprises a box 1 forming a complete enclosure except for windows 2 and 3 at which are presented the ends of cathode ray tubes 4 and 5, which ends are provided in a well known manner with a fluorescent screen. The cathode ray or oscilloscope tubes may each be of the well-known construction comprising a glass envelope 6, within which is a vacuum having at one end a fluorescent screen 7, there being at the other end well-known cathode ray generating means, not illustrated, the beam of cathode rays passing between the pairs of deflection plates 8 and 9, the pairs being at an angle of 90° with each other, and the cathode ray beam passing between these deflection plates impinges upon the screen causing a luminous spot. The cathode ray tubes are suitably supported within the box 1 which may also house other of the apparatus.

Mounted upon the box 1 and bearing against the bracket 10 is another box having the top 11, ends 12 and 13 and sides 14 and 15, but without a bottom. Within the box just referred to is supported a reflector 16 receiving light rays from the screen 7 along the line 17 which reflects along the line 18 to the reflecting surface of the mirror 19, and thence along the line 20 of vision through the window 21 in the top 11 to the eye 22 of the observer.

The mirror 19, however, is not opaque, but is of the type known as "transparent," "semi-transparent" or "half-silvered," the medium 19 being thus light-transmitting. A mirror such as 19 may be made by depositing aluminum, chroluminum or other suitable metal as is well known on the surface of the glass by evaporation. Such mirrors are well-known and therefore their construction and manufacture will not be further described here, the essential characteristics being that it shall reflect the rays of light from screen 7 as described, and shall also transmit light rays from the screen of the cathode ray tube 5, along the line of vision 20 through the medium 19 to the eye of the observer.

The pair of deflection plates 9 of the tube 5 are disposed for deflecting the rays horizontally, and this is also true of the plates 9' of the tube 6, while angularly displaced in their respective tubes by 90° about the axes of the tubes, from the plates 9 and 9' are the pairs of vertical deflection plates 8 and 8'. The vertical deflection plates 8 and 8' are respectively connected with the conductors 23 and 24 upon which are respectively impressed the potentials or voltages to be compared. The horizontal deflection plates 9 and 9' are connected in parallel with the "sweep" circuit conductors 25, such "sweep" circuits being well-known in the art.

The arrangement of a cathode ray tube with horizontal deflecting plates energized by a "sweep" circuit and vertical plates energized according to the voltage to be examined, is a well-known construction, such a tube being known as a cathode ray oscilloscope. It is believed to be new with this applicant, however, to provide the same "sweep" frequency upon the tubes whereby the graphs or curves of voltages on the tubes may be compared by bringing them into visual superposition or juxtaposition. This sameness of frequency for both of the tubes may be brought about as shown in Fig. 3 of the drawings by connecting the horizontal or "sweep" circuit deflection plates 9 and 9' of the cathode ray tubes, in parallel in the "sweep" circuit.

In order that the graph or curve of the tube may be caused to occupy any desired portion of the fluorescent screen, means is provided in both the circuit of the voltage to be investigated and of the "sweep" circuit of the tube for giving a positive or negative bias. This is true of both of the oscilloscope tubes. By suitably operating this controlling means the graph or curve of the voltage may be placed as desired upon the screen of the oscilloscope tube and so the images appearing to the observer may be given any desired positions with relation to each other. Thus this biasing controlling means is produced in the circuit of the deflection plates 8 by means of a battery 26 to an intermediate point of which is connected one of the conductors 23 so that when the pivoted switch arm 27 is at its midpoint no part of the battery will be in circuit, but by throwing this switch arm in one direction or the other to engage with different points of the potentiometer resistance 28, a plus or minus bias (and to any desired amount) as may be desired may be given to the deflection plates 8. Similarly a battery 29 is controlled to give a desired positive or negative bias to the plates 8', a battery 30 is similarly controlled to give a desired bias to the plates 9 and a battery 31 is similarly controlled to give the desired bias to the plates 9'.

As an example of the use of the apparatus just described, it will now be apparent that if it be desired to ascertain the divergence of a certain voltage from a true sine curve, the voltage to be investigated may be connected with one of the circuits 23 or 24 and the other one of those circuits is connected with a source of electro-motive-force of true sine form, the two electro-motive forces being of the same frequency. The "sweep" circuit 25 also being of the same frequency as the electro-motive forces across the conductors 23 and 24, and the graphs being disposed on the tube screens by properly adjusting the bias in the various circuits as described, the two graphs or curves may be so adjusted as to appear to coincide except where there is a variation from the voltage to be investigated from that of the true sine curve. The variation of the investigated voltage from the true sine form will thereupon be clearly apparent. It will be seen that by proper adjustment of the bias in the various circuits of the deflection plates of the tubes the graphs or curves may be made to appear in any desired relation to each other, and it will further be apparent that comparisons of other graphs, curves or images produced on the screens of the cathode ray tubes may be compared in any desired apparent relationship. Preferably the cathode ray tubes are substantially alike so that the application to them of similar voltages will produce substantially similar graphs or curves on the screens.

The tubes 5 and 6 are preferably located so that the distance traveled by any ray of light from the screen of one tube to the eye is equal to the distance traveled from a corresponding point on the screen of the other tube to the eye. This causes the horizontal deflections produced by the "sweep" voltage to appear the same on both screens, and also prevents the two images from undergoing an apparent motion relative to each other when the observer's eye is moved slightly from side to side.

A camera might be substituted for the eye of the observer and the images photographed.

It will now be evident that the device as referred to makes possible not only the viewing and photographing of the images produced by two periodic voltages, but also the viewing and photographing of simultaneous transients, provided a suitable "sweep" circuit is used, the images used or photographed being truly simultaneous and uninterrupted.

As is well known the screen of a cathode ray tube may be such that the luminosity at any point persists for a very short, if any, period after the removal of the cathode ray beam from that point, or the screen may be such that the luminosity will persist for a considerable time after the removal of the rays. In comparing the voltage images produced by the horizontal "sweep" deflections and the "vertical" deflections as described, it is preferable to use a screen of sufficient persistence so that a large part or all of the voltage wave may be observed and an accurate comparison thereby attained.

Obviously what is true of the vision of the observer as just described would also be true of a stationary (or slowly moving film compared with the "sweep" on the screen) photographic plate or film substituted for the eye of the observer. A moving film might also be substituted for the eye of the observer in which the movement of the film would supply the horizontal "sweep."

Where it is desired to photographic.lly record the voltage curve by the use of a moving film wherein the movement of the film provides the "sweep" as is well known in connection with oscillograph recording, such moving film may be substituted in place of the eye of the observer and the "sweep" plates of the cathode ray tubes may be omitted. Under such circumstances the short persistence type of fluorescent screen should be used.

According to the structure of Fig. 4 a device similar to Fig. 1 can be used for simultaneously viewing and comparing the images on the screens of three or more cathode ray tubes. Thus in Fig. 4 the box I$^{IV}$ is provided with the cathode ray tubes 34, 35 and 36 having the screens 37, 38 and 39 with the mirror 40 of the totally reflecting type, the mirror 41 of the transparent type, preferably made so that the amount of light reflected is equal to that transmitted, and the mirror 42 of the transparent type, preferably so made that the amount of light reflected is twice as great as the amount transmitted. The manner of making mirrors of the light transmitting and reflecting properties as described is well understood in the art.

With this arrangement the light rays from the screens 37, 38 and 39 will be propagated into the line of vision 43 of the eye 44 of the observer, the paths of propagation being indicated by the dot and dash lines.

It will be observed that the screens are so placed that the lengths of the paths of the light rays from the respective screens to the eye of the observer are of substantially the same length, i. e., the paths of such light rays to the reflecting surface directing the rays to the eye of the observer are equal.

It is to be observed that a two mirror optical device, similar to that of Fig. 1, may be used in place of the optical means of Fig. 4, to compare the image on the screen of the middle tube with the image on the screen of either of the other tubes. In fact the two mirror device would give clearer vision of the images because the amount of light received from each image would be greater.

Referring to the apparatus of Figs. 5 and 6, the box I$^V$ has mounted in it the cathode ray tubes 45 and 46 having the screens 47 and 48. Also there is supplied, supported upon the box I$^V$, an optical device comprising the box 49 and the totally reflecting mirror 50 reflecting the light rays from the screen of the tube 45 to the line of vision 51 of the eye of the observer 52. A rotating mirror 53 of a shape as indicated in Fig. 6 is fixed upon the shaft 54 of an electric motor 55 suitably supported upon the box I$^V$. As the blades of the mirror 53 pass across the line of vision 51, the light rays from the mirror 50 are reflected to the eye of the observer, but when the blades of the mirror are not in this line of vision the light rays from the screen 46 pass between the blades to the eye of the observer. As the mirror is rotated the light rays from the image on the screen 47 and those from the image on the screen 48 will be alternately seen, and if the speed of rotation of the mirror is great enough there is no serious flicker but the images on the two screens seem to be viewed simultaneously.

If a piece of white cardboard is laid on the surface 56 of the box I$^V$, a tracing can be made of the image produced by the cathode ray tube 45 as this image appears to be projected upon the cardboard. By moving the motor backwardly, its brackets being secured in the holes 57, and moving the box 49 with its optical devices as referred to, back a corresponding distance, namely to the surface 56, it is possible to make a tracing on a cardboard placed on the surface 158, of the image appearing on the screen 48, so that the images on the screens 47 and 48 can be compared.

In Figs. 7, 8, 9 and 10 is shown a stereoscopic device which may be used for comparing the images produced on cathode ray oscilloscope screens which may have circuit connections for producing the images to be compared as described in connection with the apparatus of Fig. 1. Thus in Figs. 7 to 10 inclusive, the cathode ray tubes 58 and 59, having the screens 60 and 61 respectively are mounted in a supporting box 62 which may house other apparatus as desired.

Supported in a bracket 63 secured to the box are lenses 64 and 65, corresponding respectively to the eyes 66 and 67 of the observer, the eyes respectively observing the fluorescent screens 60 and 61 through these lenses. If the light rays from the images on the screens 60 and 61 fall upon corresponding portions of the retinas of the eyes 66 and 67 they appear to be superposed and can therefore be accurately compared. To accomplish this the eye 66 must be oriented for viewing the screen 60 while the eye 67 is oriented for viewing the screen 61. This would be a difficult condition to attain without lenses, because the focusing function of the eyes is psychologically connected to the orienting function in such a manner that the eyes tend to orient themselves for a distance equal to that for which they are focused and this would cause each of the eyes to be oriented for viewing 60 alone or 61 alone. The use of biconvex or plano-convex lenses not only magnifies the cathode ray images but also places the optical images so far from the eyes that the eyes have little or no difficulty in attaining the necessary parallel orientation. In connection with the apparatus of Figs. 7 to 9 it was assumed that the center to center distance between the cathode ray sections was approximately equal to the interpupillary distance between the eyes. If the center to center distance between the screens were much greater than the interpupillary distance, as would be the case if large cathode ray tubes were used, prisms 68 may be placed in front of the lenses as shown in Fig. 10 to cause the light from corresponding portions of the two screens to strike corresponding portions of the retinas of the eyes. As an alternative the prisms might be combined with the lenses as they are in the known device known as the lenticular stereoscope.

While the invention has been illustrated in what are considered its best applications it may have other embodiments without departing from its spirit and is not therefore limited to the structures shown in the drawings.

What I claim is:

1. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, means for impressing "sweep" voltages of the same frequency upon the other pairs of deflection plates in said tubes respectively, and light-deflecting means for causing the lines of the luminous traces upon said screens to appear to the vision of the observer to be superposed, said deflecting means being non-diffusing whereby each of said luminous lines as traced upon said screen shall be preserved in its original definition to the vision of the observer.

2. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, a common "sweep" circuit across which the other pairs of deflection plates are connected, and light-deflecting means for causing the lines of the luminous traces upon said screens to appear to the vision of the observer to be superposed, said deflecting means being non-diffusing whereby each of said luminous lines as traced upon said screen shall be preserved in its original definition to the vision of the observer.

3. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, means for impressing "sweep" voltages of the same frequency upon the other pairs of deflection plates in said tubes respectively, and light-deflecting means for deflecting the apparent location of a line on one of the screens to an apparent location where it appears to the vision of the observer to be superposed on the line on another of said screens, said deflecting means being non-diffusing whereby each of said luminous lines as traced upon said screen shall be preserved in its original definition to the vision of the observer.

4. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, a common "sweep" circuit across which the other pairs of deflection plates are connected, and light-deflecting means for deflecting the apparent location of a line on one of the screens to an apparent location where it appears to the vision of the observer to be superposed on the line of another of said screens, said deflecting means being non-diffusing whereby each of said luminous lines as traced upon said screen shall be preserved in its original definition to the vision of the observer.

5. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, means for impressing "sweep" voltages of the same frequency upon the other pairs of deflection plates in said tubes respectively, and light-deflecting means for causing the lines of the luminous traces upon said screens to appear to the vision of the observer to be superposed, said deflecting means being non-diffusing whereby each of said luminous lines as traced upon said screen shall be preserved in its original definition to the vision of the observer, and means for biasing the potential of a pair of electrodes to shift the position of the line on the screen of the tube.

6. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, means for impressing "sweep" voltages of the same frequency upon the other pairs of deflection plates in said tubes respectively, and light-deflecting means for causing the lines of the luminous traces upon said screens to appear to the vision of the observer to be superposed, said deflecting means being non-diffusing whereby each of said luminous lines as traced upon said screen shall be preserved in its original definition to the vision of the observer, the distances along the paths of the light rays from the screens to the eye of the observer being substantially equal.

7. The combination with a plurality of cathode ray tubes having screens adapted to become luminous under the influence of the cathode rays, each of said tubes having pairs of deflection plates for deflecting the cathode rays, said pairs of plates being displaced from each other angularly about the axis of the tube, of means for impressing voltages from different sources upon pairs of said deflection plates in different tubes, means for impressing "sweep" voltages of the same frequency upon the other pairs of deflection plates in said tubes respectively, and light-deflecting means for causing the lines of the luminous traces upon said screens to appear to the vision of the observer to be superposed, said deflecting means being non-diffusing whereby each of said luminous outlines as traced upon said screen shall be preserved in its original definition to the vision of the observer, said deflecting means comprising a non-diffusing reflector receiving the light rays from one of said screens and reflecting it to the reflecting surface of a transparent reflector which reflects the last-mentioned rays to the eye of the observer, another of said screens having its light rays transmitted through said transparent reflector to the eye of the observer.

8. The method of comparing cathode ray outlines which consists in supplying voltages to be compared to deflector plates respectively of different cathode ray tubes, each of said tubes having a screen adapted to be rendered luminous by cathode rays and having "sweep" electrodes angularly displaced from the aforesaid electrodes, applying "sweep" voltages of the same frequency to the said "sweep" electrodes of said tubes, and deflecting cathode-ray-produced light rays without diffusion to the eye of the observer, so that the luminous outlines traced upon the screens will appear to the vision of the observer in their original definition and superposed.

9. The method of comparing cathode ray outlines which consists in supplying voltages to be compared to deflector plates respectively of different cathode ray tubes, each of said tubes having a screen adapted to be rendered luminous by cathode rays and having "sweep" electrodes angularly displaced from the aforesaid electrodes, applying "sweep" voltages of the same frequency to the said "sweep" electrodes of said tubes, and deflecting cathode-ray-produced light rays to the eye of the observer, so that the luminous lines traced upon the screens will appear to the vision of the observer in their original definition and superposed.

FREDERICK W. FRINK.